3,110,715
PROCESS FOR PREPARING N,N,N',N'-TETRA-
METHYLAMMELINE, ITS DIMER AND ITS
MERCURIC CHLORIDE COMPLEX
John J. Bishop, North Haven, Robert M. Thomas,
Orange, and Guenter K. Weisse, Hamden, Conn., assignors to Olin Mathieson Chemical Corporation, a
corporation of Virginia
No Drawing. Filed Apr. 14, 1961, Ser. No. 102,965
9 Claims. (Cl. 260—242)

The present invention relates to a new composition of matter and process for the preparation thereof. More specifically, the present invention resides in N,N,N',N'-tetramethylammeline and the process for the preparation thereof.

The product of the present invention, N,N,N',N'-tetramethylammeline, is prepared by admixing tetramethylguanidine and a material boiling between about 145 and 250° C. selected from the group consisting of an alcoholic compound, a phenolic compound and mixtures thereof, at an elevated temperature. The product may be prepared in accordance with the following equation given for purposes of illustration.

I. 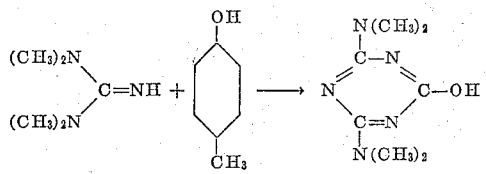

The above equation is not balanced because the mechanism of the reaction is not fully understood. The product of the present invention also exists in the tautomeric keto form as follows:

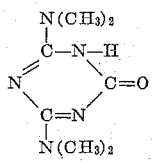

It was completely unexpected and surprising that the above reaction would give N,N,N',N'-tetramethylammeline in view of the behavior of the unsubstituted guanidine in this reaction. The pyrolysis of the unsubstituted guanidine in methylcyclohexanol produces melamine in accordance with the following reaction:

II. 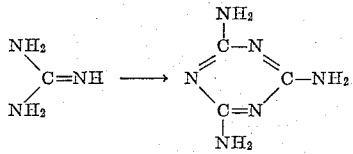

It was expected, therefore, that the pyrolysis of tetramethylguanidine in methylcyclohexanol would produce hexamethylmelamine in accordance with the following reaction:

III. 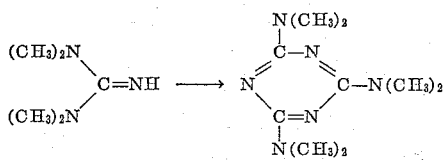

Any alcoholic compound or phenolic compound boiling between 145 and 250° C. may be employed in the process of the present invention. Typical compounds include the following given for the purpose of illustration: ortho-, meta-, or para-methylcyclohexanol; tetrahydrofurfuryl alcohol; benzyl alcohol; n-hexyl alcohol; n-heptyl alcohol; n-octyl alcohol; n-decyl alcohol; sec-decyl alcohol; propylene glycol; dipropylene glycol; butylene glycol; phenol; ortho-, meta- or para-xylenol; etc. While for some purposes certain of these compounds may be preferred, for the present process benzyl alcohol, methylcyclohexanol and tetrahydrofurfuryl alcohol are preferred.

In carrying out the process of the present invention, at least one mole of tetramethylguanidine is employed per mole of alcoholic compound or phenolic compound and preferably from one to four moles of tetramethylguanidine. Additional tetramethylguanidine may be employed, if desired, but no particular advantage is derived therefrom. The reaction is accompanied by evolution of gaseous dimethyl amine. The reaction is conducted at an elevated temperature, normally between about 145 and 250° C., and preferably between about 155 and 210° C. The time of reaction depends upon the reactants and reaction temperature. Generally, reaction times of from about 2 to 20 hours are preferred. Additional reaction times produce no particular advantage. The reaction may be run continuously by periodically withdrawing a portion of the reaction mixture and adding fresh reactants. The solid product which results may then be separated from the liquid reaction mixture by any desired means, for example, by filtration or centrifugation. The product is obtained in good yield.

The product of the present invention has a wide range of utility. It may be used as a metal complexing agent, for example, to complex the chloride of mercury. The product of the present invention has good water solubility. This is surprising in view of the normal tendency of ammelines to be only slightly soluble in water. The product of the present invention has good reactivity and therefore may be used as an intermediate in the preparation of a wide variety of compounds, for example, it will readily oxidize to ammeline, ammelide and cyanuric acid. N,N,N',N'-tetramethylammeline may also be used as a catalyst.

The process of the present invention provides a product of surprisingly high purity. If desired, however, a product of still greater purity may be obtained by any desired means, for example, crystallization from a suitable solvent, for example, ethanol.

The present invention will be more readily apparent from a consideration of the following examples, given for purposes of illustration.

*Example 1*

Tetramethylguanidine, 34.5 grams (0.3 mole), was admixed with 4-methylcyclohexanol, 11.4 grams (0.1 mole), in a 100 milliliter, round-bottom, single-neck flask equipped with a thermowell. The reaction mixture was refluxed for about 14 hours at a temperature of between about 150 and 170° C. After cooling, 9.2 grams of solid was filtered from the reaction mixture. The solid material melted at a temperature of 290 to 292° C., with decomposition, after two recrystallizations from ethanol. The solid was identified as N,N,N',N'-tetramethylammeline by elemental analysis, elemental analysis of derivatives and infra-red analysis. In the table below, there is an analysis of the product and of its picrate and hydrochloride:

|  | Found ||| Theoretical |||
|---|---|---|---|---|---|---|
|  | C | H | N | C | H | N |
| N,N,N',N'-Tetramethylammeline | 46.14 | 7.13 | 37.38 | 45.90 | 7.10 | 38.25 |
| Picrate | 37.88 | 4.33 | 27.06 | 38.88 | 3.88 | 27.19 |
| Hydrochloride | 38.28 | 5.90 | 31.04 | 38.34 | 6.39 | 31.90 |

*Example 2*

The product of Example 1, N,N,N',N'-tetramethylammeline, was found to have a molecular weight of 352 by the Rast method and 361 by depression of freezing point of water. This compound is the dimer thought to have the structural formula shown below which has a molecular weight of 366 and which has utility co-extensive with the monomer.

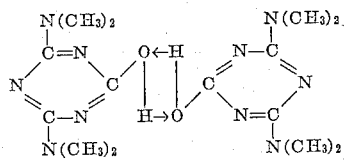

A molecular weight determination in chloroform was 201±10. This compound is the monomer which has a theoretical molecular weight of 178.

*Example 3*

In a manner after Example 1, tetramethylguanidine, 35.5 grams, and tetrahydrofurfuryl alcohol, 10.2 grams, were refluxed for about 7 hours at a temperature of between about 160 and 200° C. After cooling 10 grams of solid was filtered from the reaction mixture. The solid material melted at a temperature of 290 to 292° C., with decomposition, after two recrystallizations from ethanol and was identified as N,N,N',N'-tetramethylammeline.

*Example 4*

In a manner after Example 1, tetramethylguanidine, 39.0 grams, and benzyl alcohol, 10.8 grams, were refluxed for about 6 hours at a temperature of between about 150 and 190° C. After cooling 14.5 grams of solid was filtered from the reaction mixture. The solid material melted at a temperature of 288.5 to 290° C., with decomposition, after two recrystallizations from ethanol and was identified as N,N,N',N'-tetramethylammeline.

*Example 5*

In a manner after Example 1, tetramethylguanidine, 35.5 grams, and n-hexyl alcohol, 10.2 grams, were refluxed for about 6 hours at a temperature of between about 150 and 175° C. After cooling 3.6 grams of solid was filtered from the reaction mixture. The solid material melted at 285 to 290° C., with decomposition, after recrystallization from ethanol and was identified as N,N,N',N'-tetramethylammeline.

*Example 6*

In a manner after Example 1, tetramethylguanidine, 34.5 grams, and 3,5-xylenol, 12.2 grams, were refluxed at about 160 to 200° C. for about 6 hours. After cooling the unused xylenol was removed by distillation at reduced pressure. The residue from distillation was dissolved in hot ethanol, treated with decolorizing carbon and allowed to crystallize. Nine grams of crude solids were isolated, redissolved in hot ethanol and again treated with carbon. After two additional crystallizations the pure product was isolated, found to melt at 284 to 287° C., and was identified as N,N,N',N'-tetramethylammeline.

The following example illustrates the use of N,N,N',N'-tetramethylammeline as a metal complexing agent.

*Example 7*

Mercuric chloride, 1.35 grams, was dissolved in 50 milliliters of water and added to 100 milliliters of water containing 1.85 grams of N,N,N',N'-tetramethylammeline. A precipitate of fine, white needles formed immediately. The crystals were filtered, washed with water, recrystallized twice from ethanol and found to melt at 255 to 260° C., with decomposition. Elemental analysis calculated for $C_7H_{13}N_5O \cdot HgCl_2$ is as follows:

|  | Percent Found | Percent Theoretical |
|---|---|---|
| C | 18.30 | 18.48 |
| H | 2.96 | 2.89 |
| N | 15.64 | 15.40 |
| Cl | 16.32 | 15.59 |
| Hg | 44.2 | 44.11 |

The product is the equimolar complex of mercuric chloride and N,N,N',N'-tetramethylammeline having the following structural formula:

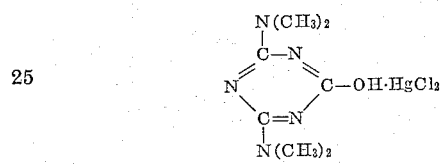

The complex also exists in the tautomeric keto form as follows:

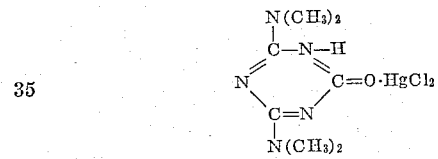

The complex finds utility in agricultural applications, for example, fungicidal applications.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. The equimolar complex of mercuric chloride and N,N,N',N'-tetramethylammeline.

2. The dimer of N,N,N',N'-tetramethylammeline.

3. A process for the preparation of N,N,N',N'-tetramethylammeline which comprises admixing at least one mole of tetramethylguanidine and one mole of a material boiling between 145 and 250° C. selected from the group consisting of an alcoholic compound, a phenolic compound and mixtures thereof at a temperature of between about 145 and 250° C., and recovering the resulting product.

4. A process according to claim 3 wherein said material boiling between 145 and 250° C. is an alcoholic compound.

5. A process according to claim 4 wherein said alcoholic compound is tetrahydrofurfuryl alcohol.

6. A process according to claim 4 wherein said alcoholic compound is methylcyclohexanol.

7. A process according to claim 4 wherein said alcoholic compound is benzyl alcohol.

8. A process according to claim 4 wherein said alcoholic compound is hexyl alcohol.

9. A process according to claim 4 wherein said alcoholic compound is 3,5-xylenol.

(References on following page)

References Cited in the file of this patent

UNITED STATES PATENTS

| | | |
|---|---|---|
| 2,381,121 | Ericks | Aug. 7, 1945 |
| 2,653,936 | MacLean | Sept. 29, 1953 |
| 2,653,937 | Kaiser | Sept. 29, 1953 |
| 2,996,505 | Schwarze | Aug. 15, 1961 |

FOREIGN PATENTS

| | | |
|---|---|---|
| 202,151 | Austria | Feb. 10, 1959 |
| 540,590 | Belgium | Feb. 16, 1956 |
| 584,917 | Great Britain | Jan. 27, 1947 |
| 1,194,416 | France | Nov. 9, 1959 |

OTHER REFERENCES

Noller: Chemistry of Organic Compounds, 2nd ed., p. 114, 229–30 (1957) (Saunders).

Smolin et al.: "S-Triazines and Derivatives," from the series of monographs on "The Chemistry of Heterocyclic Compounds," pp. 281–4 (Interscience) (1959).